United States Patent [19]
Gilbert

[11] 3,809,127

[45] May 7, 1974

[54] TWO POSITION LIQUID FLOW CONTROL VALVE

[75] Inventor: Lee N. Gilbert, China Lake, Calif.

[73] Assignee: The United States of America as represented by the Secretary of the Navy, Washington, D.C.

[22] Filed: Dec. 3, 1971

[21] Appl. No.: 204,657

[52] U.S. Cl. .................................. 138/44, 251/63
[51] Int. Cl. ...................... F15d 1/02, F16d 31/00
[58] Field of Search ................ 138/44, 45; 137/68; 251/63

[56] References Cited
UNITED STATES PATENTS

| 3,111,133 | 11/1963 | Fulton | 251/63 X |
| 3,473,543 | 11/1969 | Haefner | 251/63 X |
| 2,728,547 | 12/1955 | Crookston | 251/63 X |
| 3,548,848 | 12/1970 | Stechling | 251/63 X |

FOREIGN PATENTS OR APPLICATIONS

| 1,089,774 | 10/1954 | France | 251/63 |
| 856,000 | 11/1970 | Canada | 138/45 |

Primary Examiner—Herbert F. Ross
Attorney, Agent, or Firm—R. S. Sciascia; Roy Miller; R. F. Beers

[57] ABSTRACT

A two position liquid flow control valve comprising a piston connected to a pintle. Movement of the piston causes the pintle to move into or out of the throat of a cavitating venturi thereby altering the throat area and thus the liquid flow rate through the venturi.

5 Claims, 2 Drawing Figures

PATENTED MAY 7 1974 3,809,127

TWO POSITION LIQUID FLOW CONTROL VALVE

BACKGROUND OF THE INVENTION

The present invention relates to explosive actuated valves.

While the concept of explosive actuated valves is well known, a long standing problem has existed in this area due to the extremely rapid actuation of these valves. That problem is a sharp fluctuation in the flow of liquid through the valve when the valve is actuated. This sharp fluctuation in flow rate or surge can result in difficulties downstream of the valve such as a sudden glut of fuel in a rocket motor causing the motor to perform unsatisfactorily.

SUMMARY OF THE INVENTION

The present invention is a two position liquid flow control valve comprising a piston connected to a rod. Movement of the piston within a cylinder causes the rod to move into or out of the throat of a cavitating venturi thus altering the liquid flow rate. The present invention isolates the piston from the flow of the liquid with a portion at one end of the cylinder having a hole therein large enough only for the rod to pass through. Thereby the rod is the only moveable portion of the invention which comes in contact with the flowing liquid. The change in volume of liquid in the space wherein the liquid flows through the valve caused by the rod moving into or out of this space is minimal. Therefore a surge in liquid flow is prevented.

DESCRIPTION OF THE PREFERRED EMBODIMENTS

Figure 1:
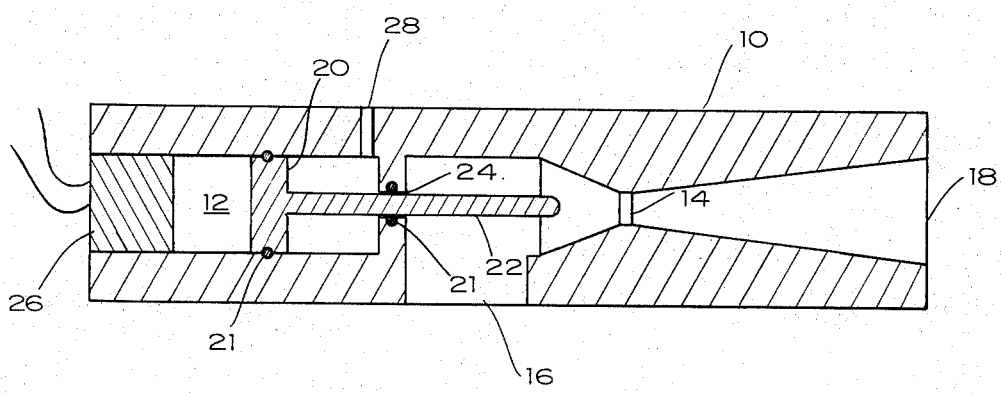
FIG. 1 is a first embodiment of the invention in cross section through its axis.
Figure 2:
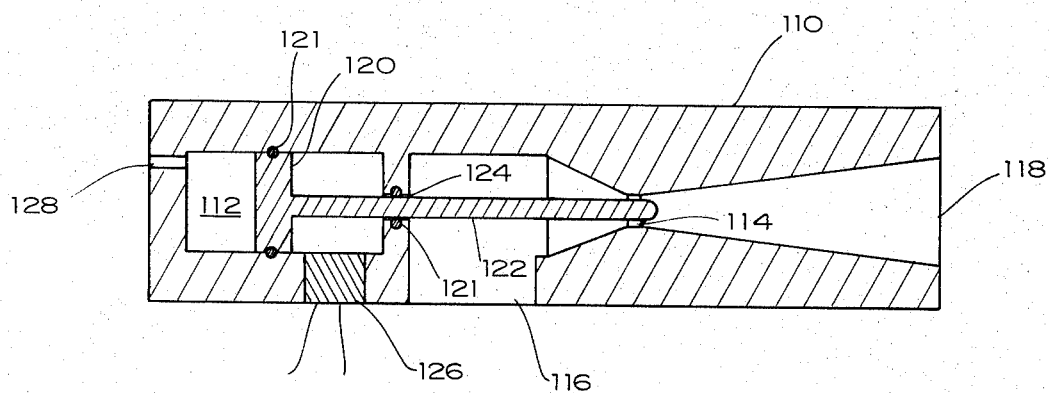
FIG. 2 is a second embodiment of the invention in cross section through its axis.

The embodiments of the invention shown in FIGS. 1 and 2 comprise a housing 10, 110 with cavities forming cylinder 12, 112 fixed area cavitating venturi 14, 114, liquid inlet 16, 116, and liquid outlet 18, 118. Piston 20, 120 and pintle 22, 122 are integrally connected and slidable along cylinder 12, 112. Rubber O-rings 21, 121 are provided as seals between the various chambers. Pintle 22, 122 extends through hole 24, 124 and through venturi 14, 114. The pintle is of a smaller diameter than the venturi so that when the rod is in the venturi, liquid will continue to flow through the venturi.

In the first embodiment shown in FIG. 1 squib 26 is located in the cylinder on the side of the piston opposite the venturi and exhaust hole 28 is located on the other side of the piston.

In operation, pintle 22 is ordinarily located outside of the venturi. When the liquid flow rate through the venturi is desired to be diminished, squib 26 is actuated driving the pintle into the venturi. Air on the side of the piston opposite the squib is allowed to exhaust through exhaust hole 28. In the second embodiment shown in FIG. 2 squib 126 and exhaust hole 128 are located on opposite sides with respect to their positions in the first embodiment (FIG. 1). Also, pintle 122 is normally located in the venturi. If a rapidly and smooth increase in flow rate is desired, the squib is actuated forcing the piston and pintle toward exhaust hole 128 so that the pintle is outside of the venturi.

What is claimed is:

1. An explosively actuated valve comprising:
   a housing;
   a fixed area cavitating venturi located within said housing;
   interior parts of said housing forming a fluid inlet in communication with said venturi, a fluid outlet in communication with said venturi and a cylinder coaxial with said venturi and on the inlet side of said venturi;
   a piston coaxial with said cylinder and moveable within said cylinder along the cylinder axis;
   the cylindrical surface of said piston being in contact with the wall of said cylinder;
   a pintle integrally attached to the end of said piston facing said venturi, said pintle being coaxial with said piston;
   a front end and a back end of said cylinder, said back end being nearer than said front end to said venturi;
   said pintle having a substantially constant diameter along its entire length and being located within the throat of said venturi when said piston is adjacent said back end and said pintle being located without said throat when said piston is adjacent said front end;
   the diameter of said pintle being smaller than the diameter of said venturi so that fluid may pass through said throat when said pintle is in said throat;
   squib actuator means for rapidly and smoothly changing the flow rate of a fluid passing through said venturi including means for rapidly moving said piston from one said end to the other said end of said cylinder.

2. The device of claim 1 wherein said actuator is located in said front end of said cylinder.

3. The device of claim 1 wherein said actuator is located adjacent said back end of said cylinder.

4. The device of claim 1 wherein said flow rate changing means comprises:
   portions of said back end forming a cylindrical opening;
   said opening being coaxial with said cylinder;
   said pintle being located in said opening;
   the diameter of said opening being slightly larger than the diameter of said pintle.

5. The device of claim 1 wherein said flow rate changing means comprises:
   an exhaust port in said cylinder located on the side of said piston opposite said flow rate changing means; and
   said port communicating the interior of said cylinder with the ambient air.

\* \* \* \* \*